(12) United States Patent
Schult et al.

(10) Patent No.: US 9,667,099 B2
(45) Date of Patent: May 30, 2017

(54) METHOD FOR OPERATING AN ENERGY INSTALLATION, AND AN ENERGY SYSTEM HAVING SUCH ENERGY INSTALLATIONS

(71) Applicant: ABB TECHNOLOGY AG, Zurich (CH)

(72) Inventors: Matthias Schult, Mulligen (CH); Dominik Flum, Weilheim (DE); Philipp Weissenberger, Windisch (CH); Thorsten Harder, Tegerfelden (CH)

(73) Assignee: ABB Schweiz AG, Baden (CH)

( * ) Notice: Subject to any disclaimer, the term of this patent is extended or adjusted under 35 U.S.C. 154(b) by 11 days.

(21) Appl. No.: 14/722,805

(22) Filed: May 27, 2015

(65) Prior Publication Data

US 2015/0256030 A1    Sep. 10, 2015

Related U.S. Application Data

(63) Continuation of application No. PCT/EP2013/057037, filed on Apr. 3, 2013.

(30) Foreign Application Priority Data

Nov. 27, 2012   (EP) ..................... 12194453

(51) Int. Cl.
| | | |
|---|---|---|
| *F03B 13/00* | (2006.01) | |
| *F03B 13/10* | (2006.01) | |

(Continued)

(52) U.S. Cl.
CPC .............. *H02J 11/00* (2013.01); *F03B 13/00* (2013.01); *F03B 15/00* (2013.01); *F03D 7/00* (2013.01);

(Continued)

(58) Field of Classification Search
USPC .............................. 290/43, 44, 54
See application file for complete search history.

(56) References Cited

U.S. PATENT DOCUMENTS 7,230,819 B2 *  6/2007  Muchow ................. F03D 9/007
                                                         307/22
7,808,127 B2 * 10/2010  Teggatz ................ H02J 7/0055
                                                         307/72

(Continued)

FOREIGN PATENT DOCUMENTS

| | | |
|---|---|---|
| DE | 20 2004 009 071 U1 | 8/2004 |
| DE | 10 2009 017 244 A1 | 10/2010 |

(Continued)

OTHER PUBLICATIONS

International Search Report (PCT/ISA/210) mailed on Sep. 12, 2013, by the European Patent Office as the International Searching Authority for International Application No. PCT/EP2013/057037.

(Continued)

*Primary Examiner* — Pedro J Cuevas
(74) *Attorney, Agent, or Firm* — Taft Stettinius & Hollister LLP

(57) ABSTRACT

A method is disclosed for operating an energy installation having a wind turbine or water turbine connected to a generator, a converter unit connected on the generator side to the generator, and an auxiliary energy unit for providing electrical energy to cover an intrinsic energy demand of the energy installation. The converter unit is connected to an electric power grid and feeds electrical energy generated by the generator into the electric power grid via the converter unit. The auxiliary energy unit is connected to the electric power grid for drawing electrical energy. In the event of a separation of the converter unit and of the auxiliary energy unit from the electric power grid, the auxiliary energy unit draws electrical energy from an energy storage unit for an (Continued)

adjustable period of time, and the auxiliary energy unit then draws electrical energy generated by the generator via the converter unit.

5 Claims, 2 Drawing Sheets

(51) Int. Cl.
| | |
|---|---|
| H02P 9/04 | (2006.01) |
| F03D 9/00 | (2016.01) |
| H02J 11/00 | (2006.01) |
| H02J 3/38 | (2006.01) |
| H02J 7/34 | (2006.01) |
| F03B 15/00 | (2006.01) |
| F03D 7/00 | (2006.01) |
| F03D 80/00 | (2016.01) |

(52) U.S. Cl.
CPC .............. *F03D 9/003* (2013.01); *F03D 9/005* (2013.01); *F03D 80/00* (2016.05); *H02J 3/386* (2013.01); *H02J 7/34* (2013.01); *H02J 7/345* (2013.01); *F05B 2210/16* (2013.01); *F05B 2270/107* (2013.01); *Y02E 10/72* (2013.01); *Y02E 10/763* (2013.01); *Y02E 10/766* (2013.01)

(56) References Cited

U.S. PATENT DOCUMENTS

| | | | | | |
|---|---|---|---|---|---|
| 7,851,935 | B2* | 12/2010 | Tsao | ............ | F03D 3/00 290/44 |
| 7,937,955 | B2* | 5/2011 | Tsao | ............ | F03D 9/002 290/44 |
| 7,964,981 | B2* | 6/2011 | Tsao | ............ | F03D 3/00 290/44 |
| 8,043,499 | B2* | 10/2011 | Saeed | ............ | C02F 9/005 210/171 |
| 8,295,033 | B2* | 10/2012 | Van Straten | ............ | F03D 1/005 280/400 |
| 8,654,512 | B2* | 2/2014 | Van Straten | ............ | F03D 1/005 280/400 |
| 8,833,985 | B2* | 9/2014 | Robertson | ............ | F21L 4/08 362/431 |
| 8,847,425 | B2* | 9/2014 | Jordan, Sr. | ............ | F03D 9/007 290/44 |
| 8,854,794 | B2* | 10/2014 | Van Straten | ............ | H02J 7/355 290/44 |
| 9,030,035 | B2* | 5/2015 | Tripathi et al. | ............ | 290/44 |
| 2007/0108769 | A1* | 5/2007 | Wobben | ............ | 290/44 |
| 2008/0068782 | A1* | 3/2008 | Muchow | ............ | F03D 9/007 361/601 |
| 2008/0284172 | A1* | 11/2008 | Nielsen | ............ | 290/44 |
| 2009/0079161 | A1* | 3/2009 | Muchow | ............ | F03D 1/001 280/400 |
| 2009/0160187 | A1* | 6/2009 | Scholte-Wassink | ............ | 290/44 |
| 2010/0026100 | A1* | 2/2010 | Teggatz | ............ | H02J 7/0055 307/82 |
| 2010/0078942 | A1* | 4/2010 | Bois | ............ | F03D 9/00 290/54 |
| 2010/0107633 | A1* | 5/2010 | Tsao | ............ | F03D 9/002 60/641.8 |
| 2010/0133820 | A1* | 6/2010 | Tsao | ............ | F03D 3/00 290/44 |
| 2010/0142237 | A1* | 6/2010 | Yuan et al. | ............ | 363/97 |
| 2010/0170293 | A1* | 7/2010 | Tsarev | ............ | F03D 9/006 62/476 |
| 2011/0025058 | A1* | 2/2011 | Nies | ............ | 290/44 |
| 2011/0080007 | A1* | 4/2011 | Tsao | ............ | F03D 3/00 290/4 R |
| 2011/0176256 | A1* | 7/2011 | Van Straten | ............ | F03D 1/005 361/601 |
| 2012/0146423 | A1* | 6/2012 | Bodewes et al. | ............ | 307/84 |
| 2012/0261917 | A1* | 10/2012 | Egedal et al. | ............ | 290/44 |
| 2013/0002189 | A1* | 1/2013 | Van Straten | ............ | F03D 1/005 320/101 |
| 2014/0091622 | A1* | 4/2014 | Lucas | ............ | H02P 6/17 307/19 |
| 2014/0125134 | A1* | 5/2014 | Van Straten | ............ | H02S 40/38 307/72 |
| 2014/0203649 | A1* | 7/2014 | Cheek | ............ | H02J 9/06 307/66 |
| 2014/0285010 | A1* | 9/2014 | Cameron | ............ | H02J 1/00 307/29 |
| 2015/0012144 | A1* | 1/2015 | Wang | ............ | H02J 3/00 700/291 |
| 2015/0084563 | A1* | 3/2015 | Lucas | ............ | H02P 6/17 318/400.29 |
| 2015/0318705 | A1* | 11/2015 | Lucas | ............ | H02J 3/381 307/129 |
| 2016/0248258 | A1* | 8/2016 | Colin | ............ | H02J 3/385 |

FOREIGN PATENT DOCUMENTS

| | | |
|---|---|---|
| EP | 2 236 821 A1 | 10/2010 |
| WO | WO 01/52379 A2 | 7/2001 |

OTHER PUBLICATIONS

Written Opinion (PCT/ISA/237) mailed on Sep. 12, 2013, by the European Patent Office as the International Searching Authority for International Application No. PCT/EP2013/057037.

International Preliminary Report on Patentability (PCT/IPEA/409) mailed Feb. 16, 2015, by the European Patent Office as the International Searching Authority for International Application No. PCT/EP2013/057037.

Notification of Transmittal of Translation of the International Preliminary Report on Patentability (Forms PCT/IB/338 and PCT/IPEA/409) issued on May 28, 2015, by the International Bureau of WIPO in corresponding International Application No. PCT/JP2013/000955. (5 pages).

* cited by examiner

METHOD FOR OPERATING AN ENERGY INSTALLATION, AND AN ENERGY SYSTEM HAVING SUCH ENERGY INSTALLATIONS

RELATED APPLICATION

This application claims priority as a continuation application under 35 U.S.C. §120 to PCT/EP2013/057037, which was filed as an International Application on Apr. 3, 2013 designating the U.S., and which claims priority to European Application 12194453.2 filed in Europe on Nov. 27, 2012. The entire contents of these applications are hereby incorporated by reference in their entireties.

FIELD

The present disclosure relates to the field of renewable energies. It is based on a method for operating an energy installation and also on a method for operating an energy system having such energy installations.

BACKGROUND INFORMATION

Wind energy systems as are used nowadays increasingly as alternative energy suppliers on account of dwindling energy resources are normally constructed on land or off the coast at sea. Such a wind energy system can include a plurality of wind energy installations, which can be connected to one another in different ways. Tidal power energy systems have in turn been installed on the seabed, wherein the tidal range or the flow of the seawater is utilized as primary energy source. Such a tidal power energy system can include a plurality of tidal energy installations, which likewise can be connected to one another in different ways.

An energy installation can include a wind turbine or water turbine, which is connected to a generator, wherein a converter unit is provided, which is connected on the generator side to the generator and can be connected on the grid side to an electric power grid. The converter unit can be connected to an electric power grid directly or via a transformer, which is used for voltage adjustment. The electric power grid may be an AC voltage grid or a DC voltage grid, wherein in the case of a DC voltage grid the above-mentioned transformer naturally is not required.

During normal operation of the energy installation, the generator is driven by the wind turbine or water turbine, wherein the electrical energy generated by the generator is fed via the converter unit into the electric power grid. The energy installation can include an auxiliary energy unit, which for example is used to supply power to the converter control, the turbine control, and/or the navigation lighting system in the case of a wind turbine and to supply power to the oil pumps for lubrication of the bearings of the moving parts of the energy installation (i.e., generally to cover the intrinsic energy demand of the energy installation).

During normal operation of the energy installation, the auxiliary energy units draws the electrical energy necessary for the above-mentioned power supply from the electric power grid and is for this purpose connected directly or via a transformer to the electric power grid. In the case of a DC voltage grid, this transformer naturally is not required. In addition, the energy installation can include an energy storage unit, which for example can be formed as a battery or as a fuel-operated emergency power unit, wherein the auxiliary energy unit is connected to the energy storage unit. In the event of a separation of the energy installation from the electric power grid, whether as a result of a grid-side fault or for maintenance or commissioning purposes, the auxiliary energy unit can no longer remove electrical energy from the electric power grid and instead removes the electrical energy necessary for the above-mentioned power supply of the energy installation from the energy storage unit.

In the case of an energy storage unit formed as a battery, the electrical energy to be removed therefrom can be drawn for example only for approximately one day. This short period of time is not acceptable for example in the event of maintenance or commissioning works on the energy installation. If the energy storage unit is formed as a fuel-operated emergency power unit, the fuel supply must always be ensured, which is complex, inefficient and costly.

SUMMARY

A method is disclosed for operating an energy installation, the energy installation having a wind turbine or water turbine connected to a generator, a converter unit connected on a generator side to the generator, and an auxiliary energy unit to provide electrical energy to cover an intrinsic energy demand of the energy installation, the converter unit being connected on a grid side to an electric power grid to feed electrical energy generated by the generator into the electric power grid via the converter unit, and the auxiliary energy unit being connected to the electric power grid for drawing electrical energy, the method comprising: drawing electrical energy from an energy storage unit via the auxiliary energy unit in an event of a separation of the converter unit and of the auxiliary energy unit from the electric power grid; in an event of the separation of the converter unit and of the auxiliary energy unit from the electric power grid, drawing electrical energy from the energy storage unit for an adjustable period of time to the auxiliary energy unit, and then drawing electrical energy generated by the generator to the auxiliary energy unit via the converter unit; electrically charging the energy storage unit, formed as a capacitive energy store or as a battery, by a charging unit; and in the event of the separation of the converter unit and of the auxiliary energy unit from the electric power grid, drawing via the charging unit, electrical energy generated by the generator via the converter unit and/or from a photovoltaic unit and/or from a wind energy unit.

A method is also disclosed for operating an energy system having a plurality of energy installations, wherein each energy installation includes a wind turbine or water turbine connected to a generator, a converter unit connected on a generator side to the generator, and an auxiliary energy unit for providing electrical energy to cover an intrinsic energy demand of the energy installation, the energy installations being connected to one another in series at their converter units on the grid side and connected to one another in series at their auxiliary energy units on the grid side, and the series connection of the energy installations being connected to an electric power grid, the method comprising: feeding electrical energy generated by the generators of the energy installations into the electric power grid via the converter unit of the series connection connected on the grid side to the electric power grid; in an event of a disconnection of the series connection of the energy installations or a total separation of the series connection of the energy installations from the electric power grid, drawing energy, by a respective auxiliary energy unit of each energy installation no longer connected to the electric power grid via the series connection, from an energy storage unit provided for each energy installation; in an event of a disconnection of the series connection of the energy installations or a total separation of the series connection of the energy installations from the electric power grid, drawing electrical energy, by a respective auxiliary energy unit, for each energy installation no longer connected to the electric power grid via the series connection, from an associated energy storage unit for an adjustable period of time, and then drawing electrical energy generated by the generator to a respective auxiliary energy unit, via the converter unit; electrically charging the energy storage unit, formed as a capacitive energy store or as a battery, by a charging unit provided for each energy installation; and in an event of a disconnection of the series connection of the energy installations or a total separation of the series connection of the energy installations from the electric power grid, drawing electrical energy, by a respective charging unit for each energy installation no longer connected to the electric power grid via the series connection, generated by the generator via the converter unit and/or from a photovoltaic unit and/or from a wind energy unit.

BRIEF DESCRIPTION OF THE DRAWINGS

These and further advantages and features of the present disclosure will become clear from the following detailed description of preferred exemplary embodiments when read in conjunction with the drawings. In the drawings.

Figure 1:
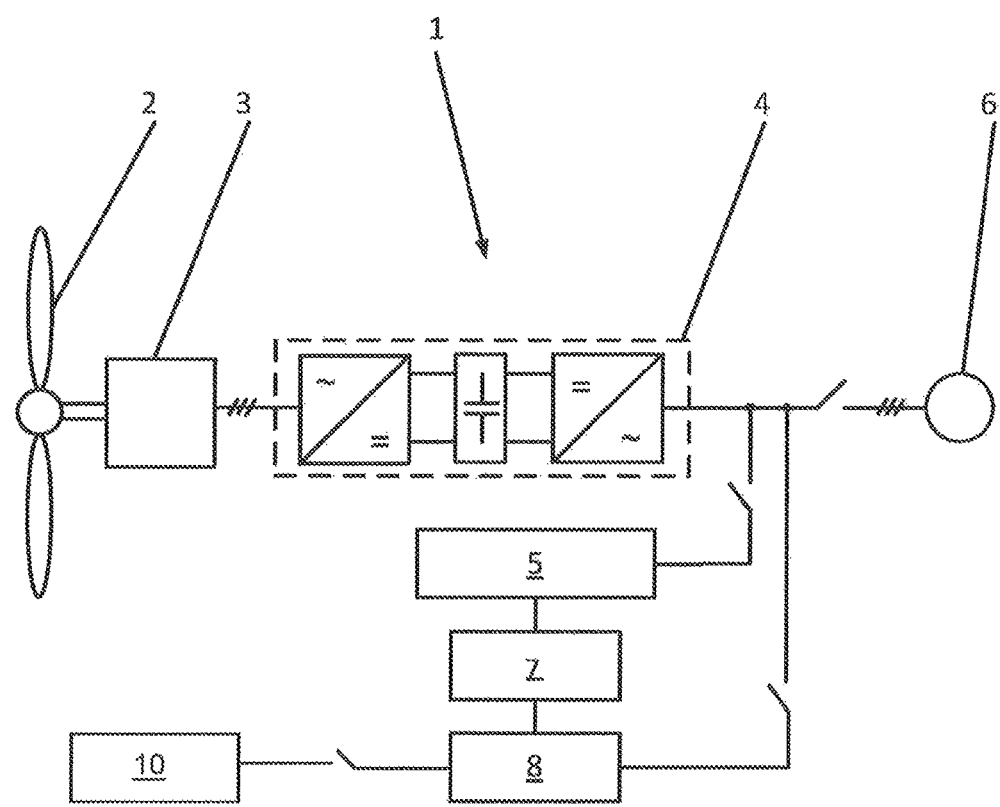
FIG. 1 shows an exemplary embodiment of an energy installation.

The reference signs used in the drawings and meanings thereof are listed by way of summary in the list of reference signs. In principle, like parts are provided with like reference signs. The described embodiments are provided by way of example for the subject matter of the invention and have no limiting effect.

DETAILED DESCRIPTION

A method is disclosed for operating an energy installation, which method makes it possible, in the event of a separation of the energy installation from the electric power grid, to cover the intrinsic energy demand of the energy installation during the separation with little effort, efficiently and economically, even over a longer period of time. A method for operating an energy system is disclosed which can include a plurality of energy installations, which method makes it possible, in the event of a separation of at least some of the energy installations of the energy system from the electric power grid, to cover the intrinsic energy demand of each separated energy installation with little effort, efficiently and economically, even over a longer period of time.

In an exemplary method according to the disclosure for operating an energy installation, the energy installation can include a wind turbine or water turbine, which is connected to a generator, a converter unit, which is connected on the generator side to the generator, and an auxiliary energy unit, which is used to provide electrical energy to cover the intrinsic energy demand of the energy installation. In accordance with an exemplary method according to the disclosure, the converter unit is connected on the grid side to an electric power grid and feeds electrical energy generated by the generator into the electric power grid via the converter unit. Furthermore, the auxiliary energy unit is connected to the electric power grid for the purpose of drawing electrical energy, wherein, in the event of a separation of the converter unit and of the auxiliary energy unit from the electric power grid, the auxiliary energy unit draws electrical energy from an energy storage unit. In accordance with exemplary embodiments, in the event of the separation of the converter unit and of the auxiliary energy unit from the electric power grid, the auxiliary energy unit now draws electrical energy from the energy storage unit for an adjustable period of time, and the auxiliary energy unit then draws electrical energy generated by the generator via the converter unit. Because the electrical energy necessary for the intrinsic energy demand in the event of the separation of the converter unit and of the auxiliary energy unit from the electric power grid is provided ultimately by the generator, the intrinsic energy demand of the energy installation during the separation can be covered advantageously with little effort, efficiently and economically, even over a longer period of time.

In an exemplary method for operating an energy installation having a plurality of above-mentioned energy installations, the energy installations are connected to one another in series at their converter units on the grid side and are also connected to one another in series at their auxiliary energy units on the grid side, wherein the series connection of the energy installations is connected to an electric power grid and electrical energy generated by the generators of the energy installations is fed into the electric power grid via the converter unit of the series connection connected on the grid side to the electric power grid. In the event of the disconnection of the series connection of the energy installations or the total separation of the series connection of the energy installations from the electric power grid, the respective auxiliary energy unit of each energy installation no longer connected to the electric power grid via the series connection draws electrical energy from an energy storage unit provided for each energy installation. In accordance with exemplary embodiments, in the event of the disconnection of the series connection of the energy installations or the total separation of the series connection of the energy installations from the electric power grid, the respective auxiliary energy unit, for each energy installation no longer connected to the electric power grid via the series connection, draws electrical energy from the associated energy storage unit for an adjustable period of time. The respective auxiliary energy unit then draws electrical energy generated by the generator via the converter unit. In the event of the disconnection of the series connection of the energy installations (i.e., the separation of some of the energy installations of the energy system from the electric power grid), or in the event of the total separation of the series connection of the energy installations from the electric power grid, the intrinsic energy demand of an energy installation no longer connected to the electric power grid via the series connection can be covered advantageously with little effort, efficiently and economically, even over a longer period of time.

FIG. 1 illustrates an exemplary embodiment of an energy installation (1) according to the present disclosure. The energy installation 1 includes a wind turbine 2, for example in the case of a wind energy installation, or a water turbine 2, for example in the case of a tidal power energy installation, which is connected to a generator 3 for example mechanically, such as via a shaft. In addition the energy installation 1 has a converter unit 4, which is connected on the generator side to the generator 3. The generator 3 can be formed as a synchronous generator, but can also be formed as an asynchronous generator or as a direct current generator. The embodiment of the converter unit 4 indicated in FIG. 1 is merely exemplary (i.e., any embodiment known to those skilled in the art is possible, depending on which type of generator 3 is connected on the generator side to the converter unit 4 and depending on which type of electric power grid 6 (DC voltage grid or AC voltage grid) is connected on the grid side to the converter unit 4).

In addition the energy installation 1 can include an auxiliary energy unit 5, which is used to provide electrical energy in order to cover the intrinsic energy demand of the energy installation 1. In FIG. 1 the connections of the auxiliary energy unit 5 to the elements of the energy installation 1 to be supplied with power have been omitted for reasons of clarity.

In an exemplary method the converter unit 4 is connected on the grid side to an electric power grid 6 and electrical energy generated by the generator is fed into the electric power grid 6 via the converter unit 4, such as when the wind turbine 2 or the water turbine 2 drives the generator 3. Further, the auxiliary energy unit 5 is connected to the electric power grid 6 for the purpose of drawing electrical energy, wherein, in the event of a separation of the converter unit 4 and of the auxiliary energy unit 5 from the electric power grid 6, the auxiliary energy unit 5 draws electrical energy from an energy storage unit 7. In accordance with an exemplary embodiment, in the event of the separation of the converter unit 4 and of the auxiliary energy unit 5 from the electric power grid 6, the auxiliary energy unit 5 draws electrical energy from the energy storage unit 7 for an adjustable period of time, for example for a few hours, and the auxiliary energy unit 5 then draws electrical energy generated by the generator 3 via the converter unit 4. The intrinsic energy demand of the energy installation 1, for example to supply power to the converter control, the turbine control, and/or the navigation lighting system in the case of a wind turbine, and to supply power to the oil pumps for the lubrication of the bearings of the moving parts of the energy installation 1, is provided ultimately by the generator 2 in the event of the separation of the converter unit 4 and of the auxiliary energy unit 5 from the electric power grid 6. Consequently, intrinsic energy demand of the energy installation 1 during the separation can be covered advantageously with little effort, efficiently and economically, even over a longer period of time.

It should be mentioned at this juncture that in an exemplary method it is possible, in the event of the separation of the converter unit 4 and of the auxiliary energy unit 5 from the electric power grid 6, to initially stop the wind turbine 2 or the water turbine 2, in particular to bring this to a standstill, and then, as described previously, for the auxiliary energy unit 5 to draw electrical energy generated by the generator 3 via the converter unit 4, in particular when the wind turbine 2 or the water turbine 2 then continues to drive the generator 3.

The energy storage unit 7 already mentioned previously is, for example, formed as a capacitive energy store or as a battery, wherein the capacitive energy store or the battery is advantageously electrically charged by a charging unit 8. If the converter unit 4 and the auxiliary energy unit 5 are connected to the electric power grid 6, the charging unit 8 draws electrical energy, for example, from the electric power grid 6 and/or from a photovoltaic unit 10 and/or from a wind energy unit. The photovoltaic unit 10 and the wind energy unit are thus used exclusively for the generation of electrical energy for the charging unit 8.

If the converter unit 4 and the auxiliary energy unit 5, as already mentioned previously, are separated from the electric power grid 6, the charging unit 8 draws electrical energy generated by the generator 3 via the converter unit 4 and/or draws from said photovoltaic unit 10 and/or from the wind energy unit. In the event of the separation of the converter unit 4 and of the auxiliary energy unit 5 from the electric power grid 6, the charging unit 8 can now thus also be supplied with electrical energy by means of electrical energy generated by the generator 3 via the converter unit 4, and/or from the photovoltaic unit 10 and/or from the wind energy unit, the electrical energy then being used to charge the energy storage unit 7 designed, for example, as a capacitive energy store or as a battery.

Figure 2:
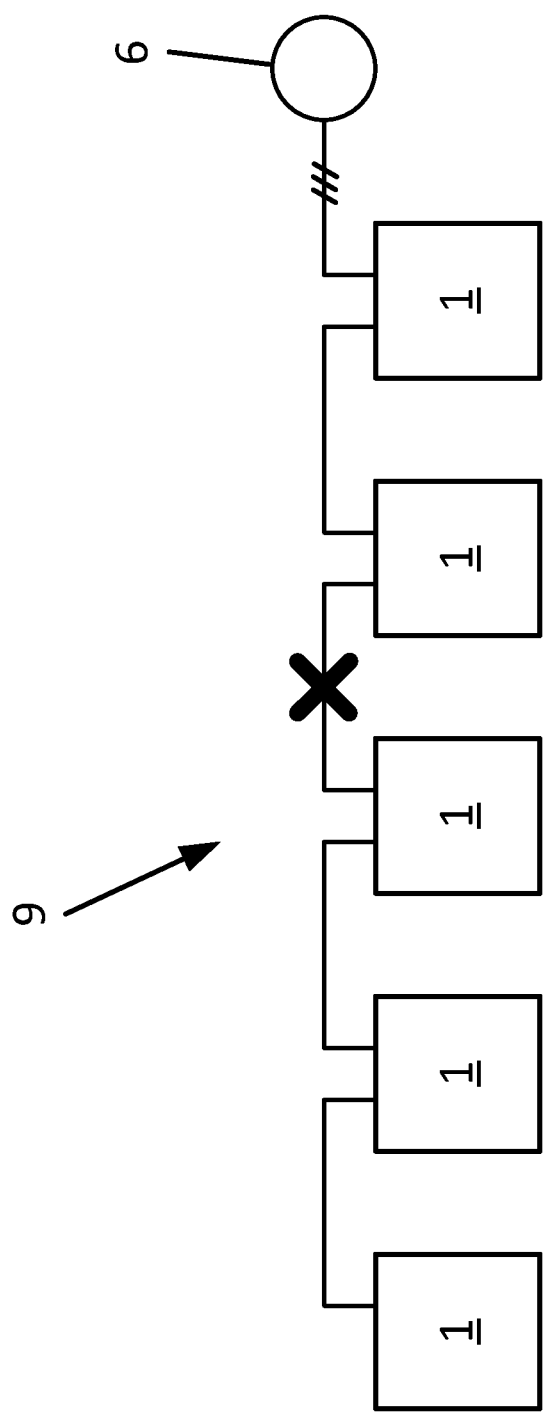
FIG. 2 shows an exemplary embodiment of an energy system having energy installations according to FIG. 1.

FIG. 2 shows an exemplary embodiment of an energy system 9 having energy installations 1 according to FIG. 1 (i.e., each energy installation 1 in FIG. 2 is formed in accordance with the previous description). In accordance with FIG. 2, the energy installations 1 in an energy system 9 are connected to one another in series at their converter units 4 on the grid side and are connected to one another in series at their auxiliary energy units 5, likewise on the grid side. In the method the series connection of the energy installations 1 is connected to the electric power grid 6, wherein electrical energy generated by the generators 3 of the energy installations 1 is fed into the electric power grid 6 via the converter unit 4 of the series connection connected on the grid side to the electric power grid 6. In the event of the separation of the series connection of the energy installations 1 (i.e., at a point between two energy installations 1 connected to one another in series), or the total separation of the series connection of the energy installations 1 from the electric power grid 6, the respective auxiliary energy unit 5 of each energy installation 1 no longer connected to the electric power grid 6 via the series connection draws electrical energy from the energy storage unit 7 provided for each energy installation 1.

In accordance with exemplary embodiments, in the event of the disconnection of the series connection of the energy installations 1 or the total separation of the series connection of the energy installations 1 from the electric power grid 6, the respective auxiliary energy unit 5, for each energy installation 1 no longer connected to the electric power grid 6 via the series connection, draws electrical energy from the associated energy storage unit 7 for an adjustable period of time, for example for a few hours. The respective auxiliary energy unit 5 then draws electrical energy generated by the generator 3 of the associated energy installation 1 via the converter unit 4 of the associated energy installation 1. By way of example a possible point at which an above-mentioned disconnection may take place is illustrated in FIG. 2 by a cross. In the event of the disconnection of the series connection of the energy installations 1 (i.e., the separation of some of the energy installations 1 of the energy system 9 from the electric power grid 6), or in the event of the total separation of the series connection of the energy installations 1 from the electric power grid 6, the intrinsic energy demand of an energy installation 1 no longer connected to the electric power grid 6 via the series connection can be covered advantageously with little effort, efficiently and economically, even over a longer period of time, for example many hours or even days.

In the event of the disconnection of the series connection of the energy installations 1 or the total separation of the series connection of the energy installations 1 from the electric power grid 6, at least one auxiliary energy unit 5 for each energy installation 1 no longer connected to the electric power grid 6 via the series connection can, for example, provide electrical energy additionally for at least one other energy installation 1. It is thus advantageously possible that, for example, an auxiliary energy unit 5 of an energy installation 1 affected by the disconnection or the total separation additionally provides electrical energy for at least one other, likewise disconnected energy installation 1.

As already mentioned, the energy storage unit 7 can be formed, for example, as a capacitive energy store or as a battery, wherein the capacitive energy store or the battery is electrically charged by a charging unit 8 provided for each energy installation 1.

If the series connection of the energy installations 1 according to FIG. 2 is connected to the electric power grid 6, the respective charging unit 8 draws electrical energy from the electric power grid 6 and/or from a photovoltaic unit 10 and/or from a wind energy unit.

In the event of the disconnection of the series connection of the energy installations 1 or the total separation of the series connection of the energy installations 1 from the electric power grid 6, the respective charging unit 8, for each energy installation 1 no longer connected to the electric power grid 6 via the series connection, draws electrical energy generated by the generator 3 via the converter unit 4 and/or draws from the above-mentioned photovoltaic unit 10 and/or from the wind energy unit. The respective charging unit 8 affected by the disconnection or the total separation can thus now also be supplied with electrical energy by means of electrical energy generated by the generator 3 via the converter unit 4, and/or from the photovoltaic unit 10 and/or from the wind energy unit, the electrical energy then being used to charge the associated energy storage unit 7 designed as a capacitive energy store or as a battery.

Thus, It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SIGNS

1 energy installation
2 wind turbine or water turbine
3 generator
4 converter unit
5 auxiliary energy unit
6 electric power grid
7 energy storage unit
8 charging unit
9 energy system
10 photovoltaic unit and/or wind energy unit

The invention claimed is:

1. A method for operating an energy installation, the energy installation having a wind turbine or water turbine connected to a generator, a converter unit connected on a generator side to the generator, and an auxiliary energy unit to provide electrical energy to cover an intrinsic energy demand of the energy installation, the converter unit being connected on a grid side to an electric power grid to feed electrical energy generated by the generator into the electric power grid via the converter unit, and the auxiliary energy unit being connected to the electric power grid for drawing electrical energy, the method comprising:

drawing electrical energy from an energy storage unit via the auxiliary energy unit in an event of a separation of the converter unit and of the auxiliary energy unit from the electric power grid;

in the event of the separation of the converter unit and of the auxiliary energy unit from the electric power grid, drawing electrical energy from the energy storage unit for an adjustable period of time to the auxiliary energy unit, and then drawing electrical energy generated by the generator to the auxiliary energy unit via the converter unit;

electrically charging the energy storage unit, formed as a capacitive energy store or as a battery, by a charging unit; and in the event of the separation of the converter unit and of the auxiliary energy unit from the electric power grid, drawing via the charging unit, electrical energy generated by a photovoltaic unit.

2. The method as claimed in claim 1, comprising:

in an event that the converter unit and the auxiliary energy unit are connected to the electric power grid, drawing by the charging unit electrical energy from the electric power grid and/or from the photovoltaic unit and/or from a wind energy unit.

3. A method for operating an energy system having a plurality of energy installations, wherein each energy installation includes a wind turbine or water turbine connected to a generator, a converter unit connected on a generator side to the generator, and an auxiliary energy unit for providing electrical energy to cover an intrinsic energy demand of the energy installation, the energy installations being connected to one another in series at their converter units on the grid side and connected to one another in series at their auxiliary energy units on the grid side, and the series connection of the energy installations being connected to an electric power grid, the method comprising:

feeding electrical energy generated by the generators of the energy installations into the electric power grid via the converter unit of the series connection connected on the grid side to the electric power grid;

in an event of a disconnection of the series connection of the energy installations or a total separation of the series connection of the energy installations from the electric power grid, drawing energy, by a respective auxiliary energy unit of each energy installation no longer connected to the electric power grid via the series connection, from an energy storage unit provided for each energy installation;

in the event of the disconnection of the series connection of the energy installations or the total separation of the series connection of the energy installations from the electric power grid, drawing electrical energy, by the respective auxiliary energy unit, for each energy installation no longer connected to the electric power grid via the series connection, from an associated energy storage unit for an adjustable period of time, and then drawing electrical energy generated by the generator by the respective auxiliary energy unit via the converter unit;

electrically charging the energy storage unit, formed as a capacitive energy store or as a battery, by a charging unit provided for each energy installation; and in the event of the disconnection of the series connection of the energy installations or the total separation of the series connection of the energy installations from the electric power grid, drawing electrical energy, by a respective charging unit for each energy installation no longer connected to the electric power grid via the series connection, generated by a photovoltaic unit.

4. The method as claimed in claim 3, wherein in the event of the disconnection of the series connection of the energy installations or the total separation of the series connection of the energy installations from the electric power grid, providing via at least one auxiliary energy unit, for each energy installation no longer connected to the electric power grid via the series connection, electrical energy for at least one other energy installation.

5. The method as claimed in claim 3, wherein in an event that the series connection of the energy installations is connected to the electric power grid, drawing via the respective charging unit electrical energy from the electric power grid and/or from the photovoltaic unit and/or from a wind energy unit.

\* \* \* \* \*